(12) United States Patent
Muecklich et al.

(10) Patent No.: US 7,290,018 B2
(45) Date of Patent: Oct. 30, 2007

(54) CHANGE-DRIVEN REPLICATION OF DATA

(75) Inventors: Andreas Muecklich, Heldelberg (DE); Wolfgang Kalthoff, Bad Schonborn (DE); Uwe Fischer, Karlsruhe (DE); Markus Breiter, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 651 days.

(21) Appl. No.: 10/278,736

(22) Filed: Oct. 23, 2002

(65) Prior Publication Data

US 2004/0083244 A1    Apr. 29, 2004

(51) Int. Cl.
*G06F 17/30* (2006.01)
(52) U.S. Cl. .................................... 707/204; 707/203
(58) Field of Classification Search ............ 707/1–10, 707/100–104.1, 200–206
See application file for complete search history.

(56) References Cited

U.S. PATENT DOCUMENTS

| | | | |
|---|---|---|---|
| 6,266,669 B1* | 7/2001 | Brodersen et al. | 707/10 |
| 6,324,693 B1* | 11/2001 | Brodersen et al. | 717/177 |
| 6,401,104 B1* | 6/2002 | LaRue et al. | 707/203 |
| 6,611,849 B1* | 8/2003 | Raff et al. | 707/203 |
| 7,003,504 B1* | 2/2006 | Angus et al. | 707/1 |
| 2001/0007103 A1* | 7/2001 | Breiter et al. | 707/1 |
| 2003/0037020 A1* | 2/2003 | Novak et al. | 707/1 |
| 2003/0078945 A1* | 4/2003 | Kibuse | 707/200 |
| 2003/0158831 A1* | 8/2003 | Zaremba | 707/1 |

OTHER PUBLICATIONS

Mortimer, T., McCurdy, D., Hayun, M., Sarstedt, F., Ember, G., and Behrens, C.; Using ADSM to Back Up Databases; International Technical Support Organizations; http://www.redbooks.ibm.com; IBM; Jul. 1998; 600 pages.

* cited by examiner

*Primary Examiner*—Joon Hwan Hwang
(74) *Attorney, Agent, or Firm*—Schwegman, Lundberg & Woessner, P.A.

(57) ABSTRACT

Change-driven replication includes determining in a first replication data included in a collection of business master data by performing an explosion of the collection of business master data and transmitting the data to be replicated from a central data system to one or more target data systems, determining which data included in the collection of business master data has changed since the first replication by exploding only the changed data, replicating only the changed data in a second replication, and transmitting the changed data from the central data system to at least one of the target data systems.

19 Claims, 4 Drawing Sheets

CHANGE-DRIVEN REPLICATION OF DATA

BACKGROUND

This invention relates to change-driven replication of data.

A lifecycle management system may coordinate the development of a product from its conception to its termination. As part of this coordination, the lifecycle management system may use a data management system to handle data related to the development of the product.

A data management system may allow replication of data including a complete and consistent business model of the product from a centrally located system to one or more productive systems by sending data to the productive systems. The business model may include information related to the product, tracing the product through its development from engineering to manufacturing. The data management system may periodically update all of the data at the centrally located system and replicate the data completely and consistently at the productive systems. Replicating the data at the productive systems enables the productive systems to access more up-to-date product development data and engineer and/or manufacture the product accordingly.

SUMMARY

According to an aspect of the invention, a machine-implemented method includes determining in a first replication data included in a collection of business master data by performing an explosion of the collection of business master data and transmitting the data to be replicated from a central data system to one or more target data systems, determining which data included in the collection of business master data has changed since the first replication by exploding only the changed data, replicating only the changed data in a second replication, and transmitting the changed data from the central data system to at least one of the target data systems.

Implementations of the invention may include one or more of the following features. It may be determined which of the target data systems should receive the changed data and transmitting the changed data to the determined target data systems. Changed data may include data included in the collection of business master data that has been added to the collection of business master data since a previous replication, data included in the collection of business master data that has been deleted from the collection of business master data since a previous replication, and/or data included in the collection of business master data that has been edited in the collection of business master data since a previous replication. A change to data included in the collection of business master data may be indicated after the first replication by associating a pointer with the changed data. Subsequent to the second replication, at least one replication may be performed of data included in the collection of business master data that has changed since a previous replication.

According to another aspect of the invention, a machine-implemented method or article includes determining which data included in a collection of business master data has changed since a previous explosion of the collection of business master data and replicating the changed data.

Implementations of the invention may include one or more of the following features. A replication of the collection of business master data may be performed before determining which data has changed. A data replication may be triggered with an occurrence of an event, and triggering the occurrence of an event may be detected by a passage of a pre-determined amount of time. A change made to data included in the business master data may be noted with a pointer and changes to data may be determined by examining pointers included in the business master data. The pointer may be associated with the data when a change to the data is made. Information may be included with the pointers relating to a time when a change becomes valid. Changes to data may be determined based at least on a timestamp included with the data.

According to another aspect of the invention, an apparatus includes a first framework mechanism configured to perform an explosion of objects included in a collection of data and changed since a previous explosion of objects included in the collection of data.

Implementations of the invention may include one or more of the following features. A second framework mechanism may be configured to transmit the changed objects to one or more target systems. The second framework may also be configured to determine which one or ones of a plurality of target systems should receive an update of which changed objects and transmit the determined changed objects specific to the determined one or ones of the target systems. A third framework may be configured to record which of a plurality of target systems are concerned with which one or ones of the objects. The first framework may also be configured to determine which one or ones of the objects included in the collection of data has changed by examining indicators included in the collection of data and associated with at least some of the objects, each of the indicators associated with an object and at least indicating a time when its associated object changed. The first framework may also be configured to ignore in the explosion objects that have not changed since a previous explosion of objects included in the collection of data. The collection of data may include business master data. At least one of the target systems may have a location of data storage different from a location storing the collection of data.

According to another aspect of the invention, a machine-implemented method includes triggering an explosion of a data structure including objects, determining which of the objects have changed since a previous explosion, and performing the explosion on the changed objects.

Implementations of the invention may include one or more of the following features. Objects may be transferred as a result of the explosion to one or more target systems. An explosion of the entire data structure and/or a change-driven explosion may be considered the previous explosion. It may be determined if the data structure includes a changed object, and if the data structure does not include the changed object, exclude the changed object from the explosion. The explosion may be triggered with a manual trigger and/or with an occurrence of an event.

According to another aspect of the invention, a machine-implemented method includes recording a change to an object when the change occurs, and using the recorded change in determining which objects included in a collection of data are to be replicated.

Implementations of the invention may include one or more of the following features. A change may be noted using a pointer, and which objects to include in the replication may be determined by determining which objects have associated pointers indicating a change from a previous replication of objects. An explosion may be performed using the determined one or ones of the objects. The record of change may include information relating to a time the change becomes valid. Objects that are not associated with a recorded change may be excluded from the replication. Objects that have been excluded from the collection of data may be excluded from the replication. Objects below, in a top-down design, the objects that have been excluded from the collection of data may be excluded from the replication. A replication may include objects below, in a top-down design, a changed object if the objects have been added to the collection of data since a last explosion but have not been changed since an explosion starting at the changed object.

One or more of the following advantages may be provided by one or more aspects of the invention.

Replicating only data that has changed since a previous data replication, referred to as change-driven replication, may save time because less than all components of a product may have incurred change since a previous replication and replication of only those changed components should take less time than replicating all components. A time savings may reduce processing costs because a change-driven replication process takes less time, and thus fewer system resources such as memory, than a full replication. Furthermore, processing time saved on replication may be used for other processing applications and make more efficient use of system resources and/or reduce system downtime due to replication.

Change-driven replication may improve development efficiency because target systems may receive more frequent updates than with typical, full data replication. Change-driven replication typically takes less time to run than full data replication, so it may be performed more frequently than full data replication. Thus, target systems may receive more frequent information updates and have more current data on hand to use in product development which may help reduce time spent working with outdated product information.

Keeping track of changes made to objects in a product model as the changes happen can allow a replication system to easily detect changed objects to be considered in a replication process. The replication system can search data for certain change information, such as that indicated by pointers, timestamps, states, and/or other similar mechanisms, and quickly determine which product data to replicate.

Change-driven explosion may be performed between full data explosions, so full updates may still be made in a system using a change-driven replication system.

Associating validity states with changed objects can allow future changes to be entered into a product data system before the changes are to take place. Validity states may indicate when changes are to take effect and/or when changes are to expire. Thus, changes may be entered into the system before they occur, potentially improving efficiency and reducing human error.

A target system may receive only the data that concerns that target system. If no objects of concern to a target system have changed since a previous replication, replication of the changed objects may still occur, but that target system need not receive an object update. In this way, target systems do not receive unnecessary information and system resources such as memory, processors, and communication links are not unnecessarily used.

A change-driven replication may be triggered upon any manual or automatic event, so the replication may be customized to particular customer needs.

Other advantages and features will become apparent from the following description and from the claims.

DETAILED DESCRIPTION

Figure 1:
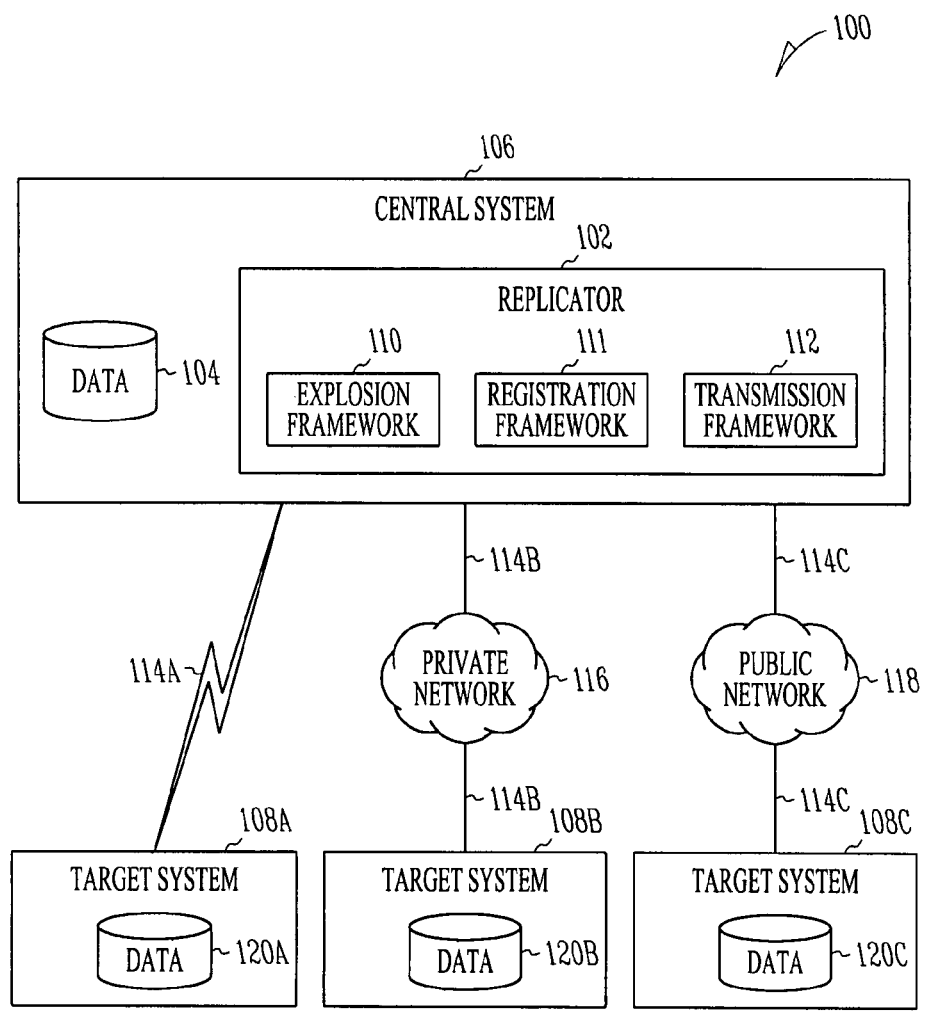
FIG. 1 is a block diagram of an example lifecycle management system.

Referring to FIG. 1, an example lifecycle management system 100 includes a replication system 102 that can replicate a collection of data 104 from a central system 106 to one or more target systems 108a, 108b, and 108c (collectively referred to as target systems 108). The replication system 102 may replicate the data 104 to the target systems 108 on a change-driven basis, only replicating those portions of the data 104 that have changed, been added, or been deleted since a previous replication of all or some of the data 104. For simplicity in this discussion, an object change may refer to an edit of the object, the addition of the object to the collection of data 104, or deletion of the object from the collection of data 104. In this way, the replication system 102 may perform more frequent and more efficient replications because a change-driven replication involving a portion of the data 104 typically takes less time and uses fewer resources than a full replication of all the data 104.

The replication system 102 may include an explosion framework 110, a registration framework 111, and a transmission framework 112 that can help perform the change-driven replication of the data 104. The explosion framework 110 can perform an explosion. Performing an explosion generally includes identifying objects included in the data 104 to be replicated, such as those objects necessary to sell, develop, manufacture, or otherwise process the entirety or part of a business or product model.

The transmission framework 112 may transmit the changed object information to one or more of the target systems 108. For a given replication, the target systems 108 may be interested in none or only some of the changed object data. For example, if a changed object involves a particular product part, not all of the target systems 108 may need information (ever or just in a change-driven, as opposed to a full, explosion) on that object depending on their role in developing, manufacturing, marketing, or otherwise acting on the product. In such a case, the transmission framework 112 may transmit different data to different ones of the target systems 108.

The transmission framework 112 may use information recorded by the registration framework 111 in determining which of the target systems 108 should receive changed object information. The registration framework 111 can define an amount of data to be replicated for each of the target systems 108, e.g., which data included in the collection of data 104 each of the target systems 108 is interested in and/or has received updates on. The transmission framework 112 or the registration framework 111 may record information when object information is sent to a target system or at a later time. The transmission framework 112 or the registration framework 111 may record, such as with a date and/or time stamp, when a target system received (or was sent) information about a particular object such as when a target system was sent information about an object change. The transmission framework 112 may use information recorded by the registration framework 111 in determining which of the target systems 108 should receive changed object information.

Generally, the data 104 includes a structure including information about a business or product model. The structure may include a collection of objects related to the business or product model and relationships between the objects. A structure may include any number of objects, e.g., tens, hundreds, thousands, etc., and each of the objects may have its own set of definitions such as specifications, characteristics documents, object dependencies, and other similar types of definitions. Examples of objects include plans, geometric models, computer aided design (CAD) drawings, images, bills of material, classes, characteristics, address data, communication channels, numerical control (NC) programs and related project data, notes, documents, and other similar types of items that may define objects and/or draw a relationship between objects. Objects may also include data tables that include one or more other objects.

Figure 2:
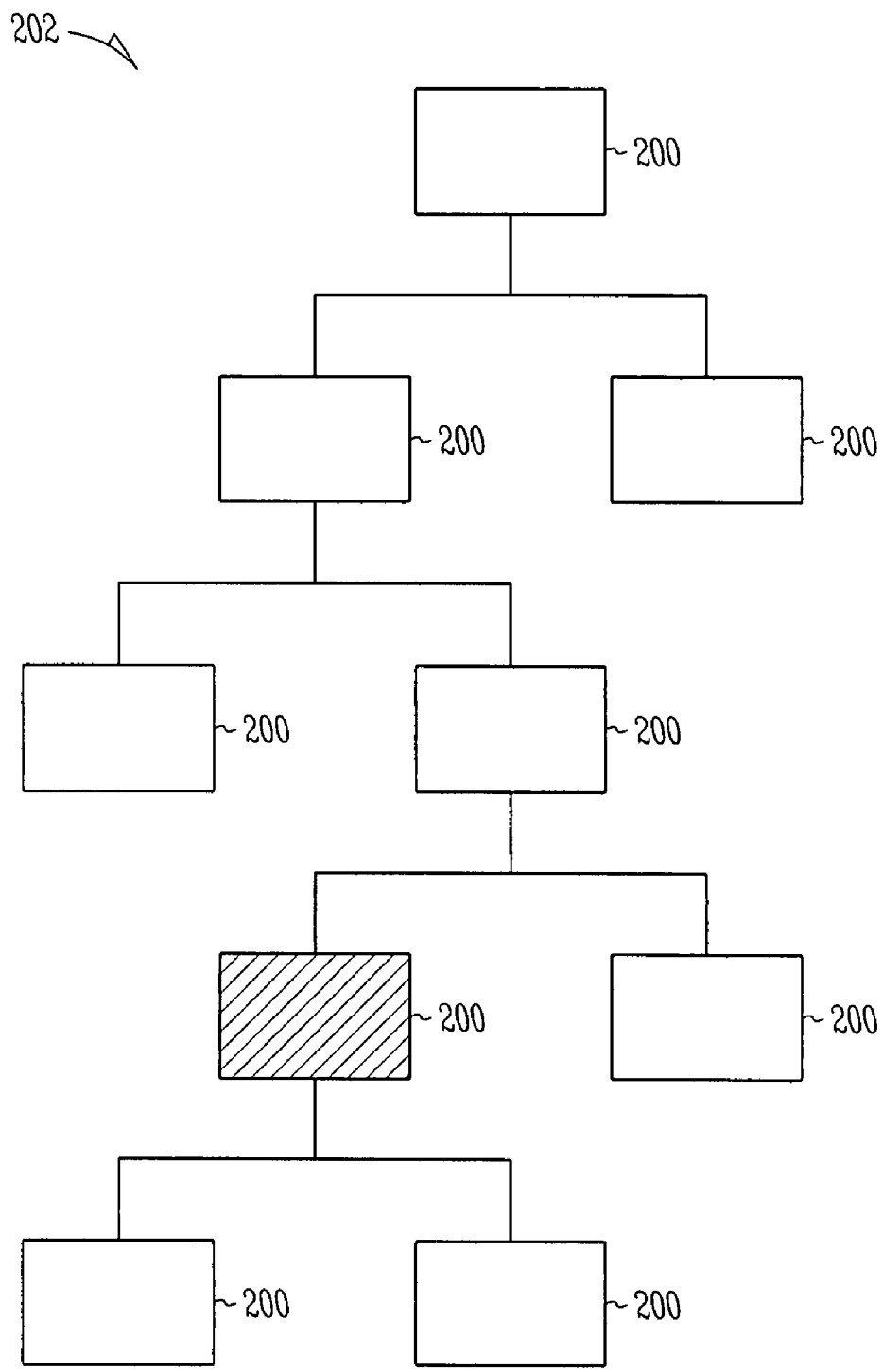
FIG. 2 is a block diagram of an example exploded structure.

The explosion framework 110 may explode the structure, e.g., examine objects included in the structure and determine which, if any, objects included in the structure have changed since a previous explosion and replicate the changed object or objects. For example, the explosion framework 110 of FIG. 1 may examine objects 200 included in a structure 202 as shown in FIG. 2. The exploded structure 202 is shown top-down and with one shaded object 200, the shading an indicator that the object 200 has changed since the last replication of the structure. The structure 202 is an example structure. Other example structures may include objects having different relationships and may include more or fewer objects.

Once exploded, the transmission framework 112 may transmit the exploded object information to one or more of the target systems 108a, 108b, and 108c using, for each of the target systems 108 respectively, a communication link 114a, a private network 116 and communication links 114b, and a public network 118 and communication links 114c. The target systems 108a-108c may store the transmitted information in their respective collections of data 120a, 120b, and 120c.

Before further discussing change-driven replication, the elements in the lifecycle management system 100 are further described. The elements in the lifecycle management system 100 can be implemented in a variety of ways.

The central system 106 and the target systems 108 can each include any device capable of communicating with the target systems 108 or the central server 106, respectively, such as a server, a mobile computer, a stationary computer, or other similar device. The systems 106 and 108 may include any type and any combination of devices.

The central system 106 is typically located at a site coordinating development, production, and/or sale of a business or product model. The target systems 108 may be located at the same or any combination of manufacturing sites, engineering sites, sales organizations, and other similar types of sites with an interest in the business or product model. The sites may be geographically local (e.g., at the same computing system, in the same building site, etc.) or remote (e.g., a different city, a different country, etc.) from the central system 106. A target system 108 may be local and included in the same computing system as the central system 106 but be in a different processing or data storage system than the central system 106 where data can be communicated between the target system 108 and the central system 106. Furthermore, the target systems 108 may include individual users who may not receive actual data updates but notification, such as by fax or electronic mail, that data in the collection of data 104 has changed.

The lifecycle management system 100 includes differing types of communication links between the central system 106 and the target systems 108 as examples only. This or another distribution system may include more or fewer target systems and any kind and any combination of communication links and/or networks between the central system 106 and the target systems 108. The target systems 108 may all use the same type of communication (i.e., all target systems 108 communicate with the central system 106 using a virtual private network) or different ones of the target systems 108 may use different communication types.

The replicator 102, explosion framework 110, and transmission framework 112 may each include one or more programs capable of being executed at the central system 106. The replicator 102, explosion framework 110, and transmission framework 112 may be part of another, larger program or programs.

The collections of data 104, 120a, 120b, and 120c can each include a data storage mechanism such as a database, data queue, a buffer, a local or remote memory device, random access memory (RAM), a cache, or other similar mechanism. The collections of data 104, 120a, 120b, and 120c may each include one or more individual storage mechanisms.

The collections of data 104, 120a, 120b, and 120c may include any type(s) of data, including product development data and business master data. Generally, product development data includes information related to a product's creation as it passes from engineering to manufacturing. Generally, business master data includes information related to a business-related product or enterprise.

The private network 116 can include any kind and any combination of networks providing secured and/or limited access such as Intranets, local area networks (LAN), wide area networks (WAN), secure networks configured within a public network such as virtual private networks (VPN), and other similar networks.

The public network 118 can include any kind and any combination of publicly accessible networks such as an Internet, local area networks (LAN), wide area networks (WAN), Extranets, and other similar networks.

Data can be communicated between elements on communication links, e.g., communication links 114a, 114b, and 114c. Communication links can include any kind and any combination of communication links such as buses, physical ports, modem links, Ethernet links, cables, point-to-point links, infrared connections, fiber optic links, wireless links, cellular links, Bluetooth, satellite links, and other similar links. Additionally, each of the communication links may include one or more individual communication links.

Furthermore, the lifecycle management system 100 is simplified for ease of explanation. The lifecycle management system 100 may include more or fewer additional elements such as networks, communication links, collections of data, proxy servers, hubs, bridges, switches, routers, processors, storage locations, firewalls or other security mechanisms, Internet Service Providers (ISPs), target systems, and other elements.

Figure 3:
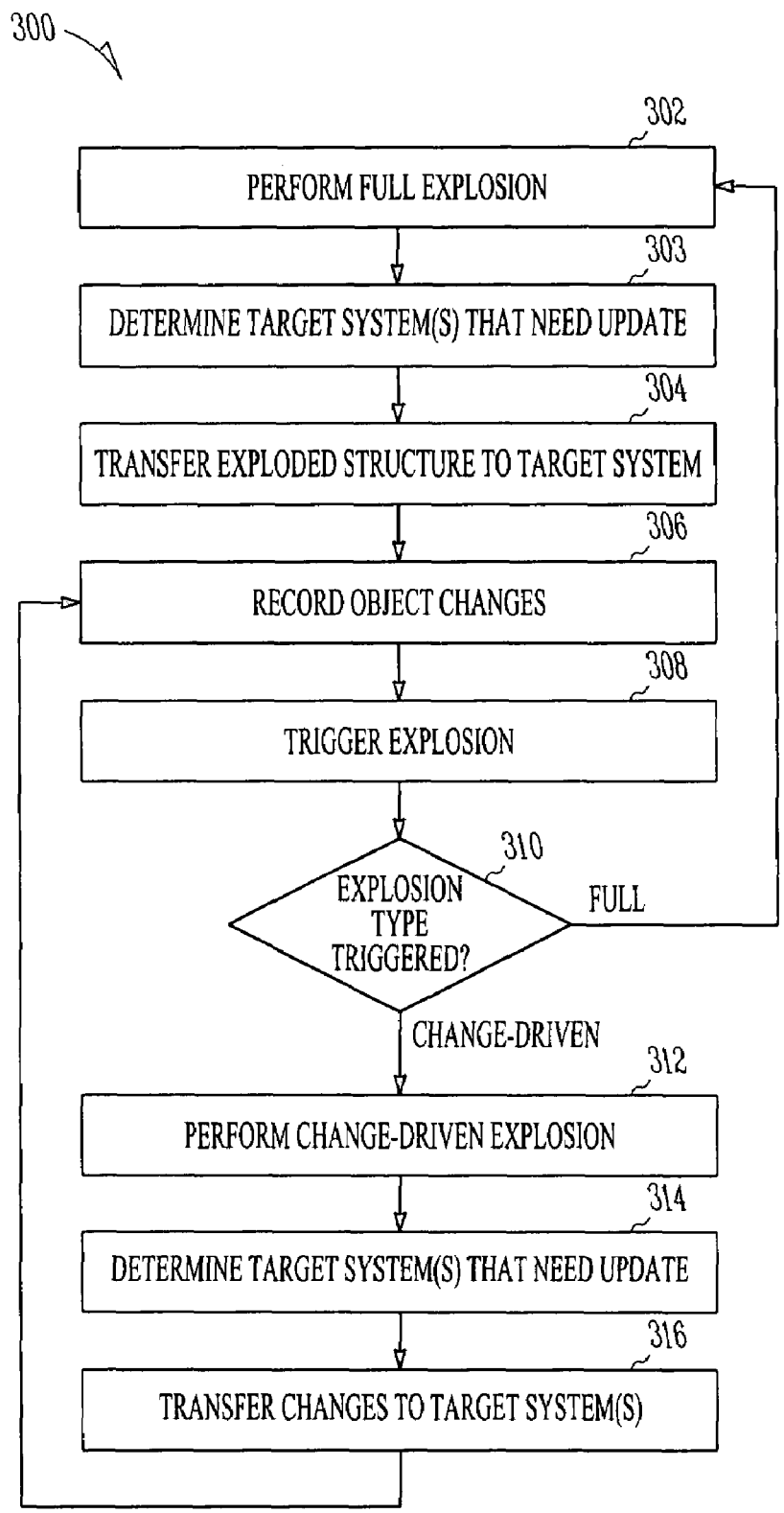
FIG. 3 is a flowchart showing an example process of performing data replication.

Referring to FIG. 3, an example process 300 of performing data replication is shown. In the process 300, the central system 106, using the replicator 102, performs a cycle of full and change-driven replications, each replication including a replication of some or all of the data 104 and transmission of the replicated data to one or more of the target systems 108.

The explosion framework 110 can perform 302 a full explosion of the data 104. It may be desirable or required for the central system 106 to perform a traditional, full explosion and replication of the data 104 at the beginning of a replication process including change-driven replication. By performing a full explosion of the data 104, the central system 106 can ensure completeness of the data 104 and establish or edit relationships between objects included in the data. Performing a full explosion before performing a change-driven explosion can provide a starting point, a base object structure, that can be used in performing a change-driven replication.

Once the explosion framework 110 explodes the data 104, the transmission framework 112 can determine 303 which one or ones of the target systems 108 should receive the exploded data and transmit 304 the exploded data to the one or ones of the target systems 108. In this way, the target systems 108 may each receive a complete, consistent, and contemporary version of the data 104.

After performing a full explosion, the replicator 102 may perform one or more change-driven explosions using information about changed objects since a previous explosion. Performing change-driven explosions between full explosions can help ensure better data quality for the target systems 108 between full data explosions because the target systems 108 may receive more frequent data updates.

Changes to the data may be recorded 306 with the data 104 after the full explosion (and, as further discussed elsewhere, after subsequent replications). The registration framework 111, a program that changes the data 104, or other application having access to the data 104 included inside or outside the central system 106 may record changes with the data 104.

Changes to the data 104 may be noted synchronously such that when a change to data included in the collection of data 104 occurs, the change may be recorded when the data is changed or written to a storage location such as a database included in the collection of data 104. Noting a change when the change occurs does not have to be at the same literal time that the change occurs. It may be at a time substantially close to the time of change, e.g., in a series of change-related events such as changing the data in a certain number of computer clock cycles and noting the change with a pointer to the data at its stored database location a certain number of clock cycles later.

Examples of data changes that may be recorded include editing and saving a new version of an object such as a document or drawing, storing an object at a new address, changing a characteristic of an object such as size, weight, or construction material, adding a new object (e.g., writing data to a database), deleting an object, and other similar types of changes.

Changes may be recorded any number of ways. For example, every changed object may have an associated change indicator stored with it in the collection of data 104 or in another location accessible to applications that may use the indicators such as the replicator 102. An indicator may include a Boolean flag or data bit indicator including a change state and a non-change state. Another indicator example includes a marker stored with changed data such that presence of the marker indicates change to the replicator 102. Yet another indicator example includes a change pointer such as a persistent small object included in the collection of data 104 that points to changed data.

An indicator may not simply indicate change but may include one or more pieces of information related to the change. Examples of such information include an object type, an object key, a timestamp indicating when the change was made, author information such as who made the change and/or a location that changed the data, a validity (such as a state) indicating when a change takes effect (e.g., not until one month from when the change was entered) and/or when a change is valid (e.g., from day X until day Y), and other similar types of information.

Including validity information with a change indicator allows a change to be made to an object when the change is known without affecting the structure until the change becomes effective. For example, a product's price may be known to increase by five percent at the end of the year, and instead of waiting to enter the change when it happens, the price change may be included in the data 104 anytime after the price increase is known with an associated indicator making the change valid at the end of the year.

An object's validity may be tied to and depend on another object's validity. For example, a price increase for a car may be dependent upon a design change to one component of the car being implemented by a certain date. In other words, a manufacturing change must occur before a price change can occur. A change number may be associated with the manufacturing change and the price change and be associated with objects in the data that include information on the manufacturing change and/or the price change. Objects associated with the change number may not be considered as having a valid change by the explosion framework 110 until the change number is released.

Changes are recorded for the data 104 until an explosion is triggered 308. The replicator 102 may detect and/or trigger explosions.

Explosions may be triggered manually and/or automatically. Examples of manual triggers include human-induced triggers such as pressing a control button, selecting an explosion function through a machine such as a computer, and other similar types of human-induced triggers. Examples of automatic triggers include occurrences of events such as passage of a certain amount of time (any amount of minutes, hours, days, weeks, months, etc.), release of a change number, changes made to object attributes, preset triggers such as days before holidays, plant shutdowns, product development deadlines, and such, and other similar types of automatic triggers.

Upon detecting a trigger, the replicator 102 determines 310 what explosion type (full or change-driven) was triggered. Full explosions are typically triggered with less frequency than change-driven explosions because full explosions use more resources and take more time than change-driven explosions. It may be possible to trigger a change-driven explosion but for the replicator 102 to determine that a full explosion was triggered (i.e., that a full explosion should be performed instead), or vice versa. The replicator 102 may make such a determination based on any number of factors, such as who or what triggered the explosion and what types of explosions may be triggered by that source.

If a full explosion was triggered, then the replicator 102 can perform 302 a full explosion as described above and continue with the process 300.

If a change-driven explosion was triggered, then the explosion framework 102 may perform 312 a change-driven explosion. Generally, in the change-driven explosion, the explosion framework 110 performs an explosion to determine which data to replicate to the productive or target systems.

Figure 4:
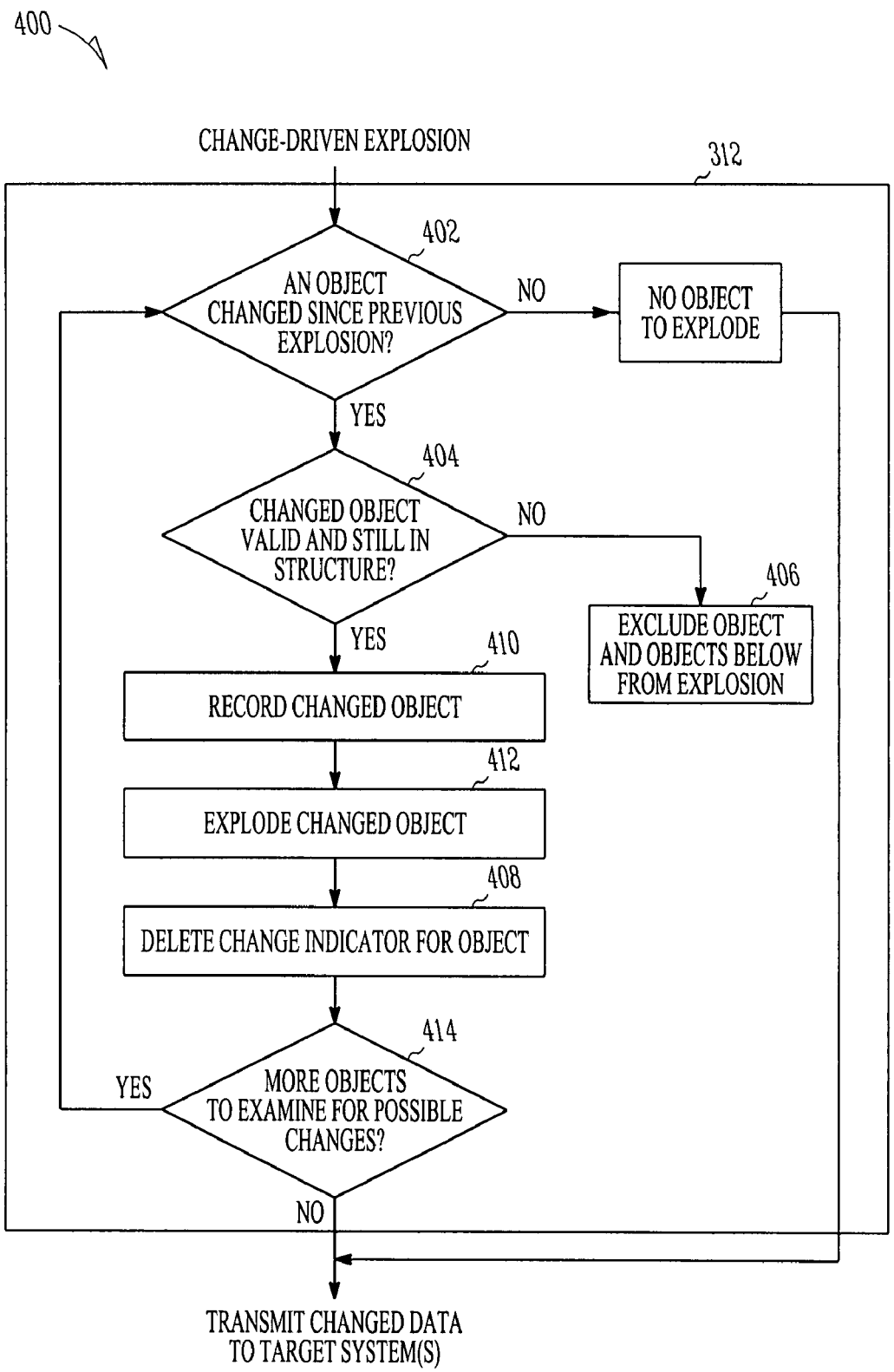
FIG. 4 is a flowchart showing an example process of performing change-driven data replication.

Referring to FIG. 4, an example change-driven process 400 shows how the explosion framework 110 may perform 312 a change-driven explosion. In the process 400, the explosion framework 110 determines 402 if data in the collection of data 104 has changed. If the explosion framework 110 does not detect any changes to the data 104, then there is no changed object to explode. The transmission framework 112 does not have any changed data to send to the target systems 108, but the transmission framework 112 may send a message to the appropriate ones of the target systems 108 indicating that there were no detected changes.

The explosion framework 110 may examine the data 104 (and/or any other appropriate location or locations) for changes, such as by looking for change indicators. If an object has a change indicator, then the explosion framework 110 can assume that the object has changed. The explosion framework 110 may also or instead search for changes by examining timestamps associated with objects. If an object has an associated timestamp dated/timed after a previous replication, then the explosion framework 110 may assume that the object or objects associated with that object have changed. The explosion framework 110 may be searching for changes since a preceding replication, be it a full or change-driven replication.

If the explosion framework 110 locates a changed object in the data 104, the explosion framework 110 may determine 404 if the changed object is valid and still included in the object structure. The explosion framework 110 may not determine object validity if change validities are not enabled in the lifecycle management system 100, e.g., if validity states are not enabled or included with change pointers.

The explosion framework 110 may determine validity by examining the change indicator associated with the changed object. An object may be valid only between certain dates or times and/or starting at a certain date or time. The explosion framework 110 checks to see that the change is currently valid. If not, the explosion framework 110 can exclude 406 the object from the change-driven explosion because the object has not yet changed for purposes of replication. The explosion framework 110 may also delete 408 the change indicator associated with the changed object if the change to the object is not valid, but the explosion framework 110 may delete the change indicator only if the object cannot be valid in the future, such as if the object's validity window has passed or the change expired.

The explosion framework 110 may determine if the changed object is still included in the structure by examining object relationships in the structure. For example, an object may have been taken out of the business or product model and be included in the data 104 as outdated data not having any current relevance to the model and thus not be included in the structure. If the changed object is not included in the structure, then the explosion framework 110 may exclude 406 the changed object from the change-driven explosion and may delete 408 the change indicator associated with the changed object.

If the explosion framework 110 determines that a changed object is invalid or excluded from the structure, the explosion framework 110 may also exclude all objects located below the changed object from the change-driven explosion and/or delete any change indicators for those objects. For example, in the structure 202 of FIG. 2, if the shaded, changed object 200 is invalid, then the explosion framework 110 may exclude the two objects 200 below the shaded object from the change-driven explosion.

If the changed object is valid and still included in the structure, then the explosion framework 110 may record 410 the changed object. Recording the changed object generally includes noting that a change to the structure was detected.

The explosion framework 110 may also explode 412 the changed object. Exploding the changed object generally includes updating the structure given the change, typically in a top-down fashion such that objects below the object in the top-down design are noted as changed if the change to the top object affects a lower object.

After exploding the changed object, the explosion framework 110 may delete 408 the change indicator for the changed object. In this way, the change will not be detected and acted upon in a subsequent change-driven explosion. Removing the change indicator can also prevent the process 400 from running in an infinite loop.

After deleting the change indicator for the changed object, the explosion framework 110 may determine 414 if the structure includes more objects to examine for possible changes. Generally, the explosion framework 110 examines the structure top-down, so if there are more objects down in the structure that have not already been eliminated from explosion or changed as under a changed object, then the explosion framework 110 has more objects to examine in the structure. If there are more objects to examine, then the explosion framework 110 determines 402 which data has changed and continues the process 400. If there are no more objects in the data 104 to examine, then the transmission framework 112 may transmit the changed data to the appropriate ones of the target systems 108.

Referring again to FIG. 3, once the explosion framework 110 has performed the change-driven explosion, the transmission framework 112 may send the changed data to the appropriate target system(s) 108. If the explosion framework 110 did not detect any changes in the structure, then the replicator 102 does not have any changed data to send to the target systems 108 and the process 300 may go back to recording 306 object changes without transmitting changed data to the target systems 108. The transmission framework 112 may send a no-change message to all of the target systems 108 if no changes were detected at all or to the one or ones of the target systems 108 for which no relevant changes were detected.

Not all of the target systems 108 may be concerned with all of the data included in the collection of data 104, and if a target system is not interested in any of the changed data, then the transmission framework 112 need not send any changed data to that target system. Information recorded by the registration framework 111 can be used in determining which of the target systems 108 are concerned with what data. Such selective transmission may save system resources and processing time at the central system 106 and on communication links and networks between the central system 106 and the target systems 108 because less data need be processed and transmitted than with a replication of all the data 104.

The transmission framework 112 can determine 314 which one or ones of the target systems 108 should receive the changed data. The transmission framework 112 may make such a determination using one or more tables. An association table may include a list of all objects included in the data 104 and which of the target systems 108 are concerned with each one of the objects.

Having determined which changes should be sent to which of the target systems 108, the transmission framework 112 may transmit 316 the changed data and/or notification that data has changed, such as an indication that the data has been deleted from the collection of data 104, been newly added to the collection of data 104, and/or where or how to access the changed data, to the target systems 108. The transmission framework 112 may send the changed data (or notifications) in any format to the target systems 108. Different target systems may receive the changes in different ways. For example, changed data and/or notifications may be sent to target systems 108 as intermediate documents, as extensible markup language (XML) or other protocol-based messages, by electronic mail, by fax, or in another similar manner.

Although the processes 300 and 400 are described with reference to the elements included in the example lifecycle management system 100 of FIG. 1, these or similar processes, including the same, more, or fewer elements, reorganized or not, may be performed in the lifecycle management system 100 or in another, similar system.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile computers, stationary computers, servers, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A machine-implemented method comprising:
   identifying data to be replicated in a collection of product modeling business master data by performing a full explosion of the collection of product modeling business master data;
   replicating the identified data in a first replication by transmitting the identified data from a central data system to one or more target data systems;
   identifying valid changed data in the collection of product modeling business master data, wherein the valid changed data comprises changed data that is valid in the product model;
   identifying changed data with pending validity in the collection of product modeling business master data, wherein the changed data with pending validity comprises changed data in the collection of product modeling business master data that has yet to become valid in a product model; and
   replicating the valid changed data but not the changed data with pending validity in a second replication by transmitting the valid changed data but not the changed data with pending validity from the central data system to at least one of the target data systems.

2. The method of claim 1, further comprising limiting transmission of the valid changed data to target data systems receiving the valid changed data.

3. The method of claim 1, wherein the valid changed data comprises data that has been added to the collection of product modeling business master data since the first replication.

4. The method of claim 1, wherein the valid changed data takes into account data that has been deleted from the collection of product modeling business master data since the first replication.

5. The method of claim 1, wherein the valid changed data comprises data that has been edited since the first replication.

6. The method of claim 1, further comprising identifying changed data with pending validity by associating a pointer with the changed data.

7. The method of claim 1, further comprising, subsequent to the second replication, performing a third replication of data in the collection of business master data that includes transmitting second valid changed data with formerly pending validity from the central data system to at least one of the target data systems.

8. The method of claim 1, wherein:
   the valid changed data is found in changed objects in the collection of product modeling business master data; and
   the method further comprises updating objects below the changed objects to reflect at least one change to the changed objects.

9. A machine-implemented method performed in response to a single triggering event, comprising:
   noting edits that have yet to become valid and that are made to first data in a first collection of business master data using pointers associated with the first data, wherein the pointers comprise information describing a time when the edits that have yet to become valid do become valid;
   identifying the first data in a first collection of business master data based on the pointers associated with the first data, the first data having been edited since a previous explosion of the first collection of business master data, wherein an the editing of the first data is indicated by the pointers;
   updating the first collection of business master data based on the edits made to the first data having becoming valid, the updating comprising editing second data in the first collection of business master data based on the edits made to the first data;
   replicating the valid edited first data and the edited second data, after performing the updating, by transmitting the valid edited first data and the edited second data to a second collection of business master data at a target system; and
   resetting the change indicator following the transmission.

10. The method of claim 9, further comprising replicating the first collection of business master data before identifying the first data.

11. The method of claim 9, wherein the valid edited first data and the edited second data are transmitted in response to detection of a passage of a pre-determined amount of time.

12. The method of claim 9, wherein noting the edits made to the first data comprises associating the pointers with the first data when the edits are made.

13. The method of claim 9, wherein the first data is identified based on at least one timestamp included with the first data.

14. The method of claim 9, wherein updating the first collection of business master data comprises updating an object below a first object in a top-down structure, the first object comprising the first data.

15. A machine-implemented method comprising:

recording, in a collection of business master data having a top-down structure, an indicator that an edit that has yet to become valid to an object in the collection has occurred by noting the edit using a pointer associated with the edited object, wherein the collection comprises at least a changed object and an unchanged object and the indicator comprises information describing a time when the edit that has yet to become valid does become valid;

identifying the edited object using the indicator and editing objects below the edited object in the top-down structure to reflect the edit to the edited object;

determining which objects in the collection are to be replicated, based on the indicator and the editing by determining which objects have associated pointers; and replicating valid edited objects without replicating unchanged objects in the collection by transmitting the valid edited objects to a target data system.

16. The method of claim 15, wherein editing objects below the edited object comprises performing an explosion on the edited object.

17. The method of claim 15, wherein replicating the valid edited objects comprises excluding, from replication, objects that have been excluded from the collection of data.

18. The method of claim 17, further comprising excluding, from replication, objects below the objects that have been excluded from the collection of data.

19. The method of claim 15, further comprising replicating objects below the edited object if the objects have been added to the collection of data since a last explosion.

* * * * *

UNITED STATES PATENT AND TRADEMARK OFFICE
CERTIFICATE OF CORRECTION

PATENT NO.      : 7,290,018 B2             Page 1 of 1
APPLICATION NO. : 10/278736
DATED           : October 30, 2007
INVENTOR(S)     : Muecklich et al.

It is certified that error appears in the above-identified patent and that said Letters Patent is hereby corrected as shown below:

On the title page, item (56), under "Other Publications", in column 2, line 3, delete "Organizations" and insert -- Organization --, therefor.

In column 12, line 48, in Claim 9, after "wherein" delete "an".

In column 12, line 51, in Claim 9, delete "becoming" and insert -- become --, therefor.

In column 12, line 60, in Claim 9, delete "change indicator" and insert -- pointers --, therefor.

In column 14, line 2, in Claim 15, after "replicated" delete ",".

Signed and Sealed this

Second Day of September, 2008

JON W. DUDAS
*Director of the United States Patent and Trademark Office*